(12) United States Patent
Pendl

(10) Patent No.: US 8,272,647 B2
(45) Date of Patent: Sep. 25, 2012

(54) CARGO CART WITH ATTACHABLE SKIS AND METHOD OF USE THEREOF

(76) Inventor: Robert J. Pendl, Gloversville, NY (US)

( * ) Notice: Subject to any disclaimer, the term of this patent is extended or adjusted under 35 U.S.C. 154(b) by 166 days.

(21) Appl. No.: 12/836,616

(22) Filed: Jul. 15, 2010

(65) Prior Publication Data

US 2012/0013082 A1 Jan. 19, 2012

(51) Int. Cl.
*B62B 13/18* (2006.01)
(52) U.S. Cl. .......................... 280/7.12; 280/8
(58) Field of Classification Search ............ 280/34, 280/42, 638, 639, 655, 656, 655.1, 7.12, 280/7.14, 9–11; D12/6; 29/401.1
See application file for complete search history.

(56) References Cited

U.S. PATENT DOCUMENTS

| | | | |
|---|---|---|---|
| 1,005,379 A | 10/1911 | Walters | |
| 1,409,501 A | 3/1922 | Volz | |
| 1,695,710 A | 12/1928 | Georgius | |
| 2,950,924 A | 8/1960 | Gantz | |
| 3,011,576 A | 12/1961 | Howes | |
| 3,442,268 A | 5/1969 | Symes | |
| 3,623,563 A | 11/1971 | Gostomski | |
| 3,653,677 A | 4/1972 | Feser | |
| 3,784,230 A | 1/1974 | Worrall, Jr. | |
| 3,901,525 A * | 8/1975 | O'Brien et al. ............... | 280/14 |
| 4,337,957 A | 7/1982 | Heine | |
| 4,417,765 A | 11/1983 | Wirsbinski | |
| 4,738,457 A | 4/1988 | Conrad | |
| 4,819,956 A * | 4/1989 | Campbell .................... | 280/203 |
| 6,113,116 A | 9/2000 | Stanton et al. | |
| 6,331,008 B2 | 12/2001 | Cormican | |
| 6,536,846 B1 | 3/2003 | Felty | |
| 6,932,359 B2 | 8/2005 | Ouellette | |
| 6,945,743 B2 * | 9/2005 | Sherman et al. ............. | 414/476 |
| 7,543,842 B1 | 6/2009 | Fiorini | |

FOREIGN PATENT DOCUMENTS

CA 2691122 A1 * 5/2010

* cited by examiner

*Primary Examiner* — John Walters
*Assistant Examiner* — James Triggs
(74) *Attorney, Agent, or Firm* — Schmeiser, Olsen & Watts, LLP

(57) ABSTRACT

A cargo cart comprising a bed configured for carrying cargo, the bed having a front side, a back side, a left side and a right side, the bed having an upper surface and an under surface; an axle located beneath the under surface of the bed and extending from a left end proximate the left side of the bed to a right end proximate the right side of the bed, the axle having a first bend proximate the left end, the axle extending from the first bend away from the bed, the axle having a second bend proximate the right end. the axle extending from the second bend away from the bed, the axle having a first attachment location at the left end and a second attachment location at the right end.

18 Claims, 11 Drawing Sheets

CARGO CART WITH ATTACHABLE SKIS AND METHOD OF USE THEREOF

FIELD OF THE INVENTION

The subject matter disclosed herein relates generally to cargo carts. More particularly, the subject matter relates to a cargo cart that is adaptable between a wheeled embodiment and a sled embodiment and method of use thereof.

BACKGROUND OF THE INVENTION

Cargo carts or vehicles, such as garden carts, dump carts, or the like, are utilized by people for transporting cargo in various situations. A typical cargo cart includes a bed for retaining the cargo for transport, and wheels for mobility. Carts may be utilized for any type of cargo, such as chopped wood, bricks, stone, dirt, plants, mulch and the like. Cargo carts may have various shapes, sizes, load capacities. Some may be attachable to a vehicle, while others may require hand pushing or pulling. However, the mobility of a cargo cart may be reduced in the winter time when there is snow, slush or ice on top of the surface that the cargo cart must travel. In this situation, a cargo cart having a low riding bed may build up snow under the cart. Furthermore, the wheels may get stuck in the snow or reduce the stability of the cargo cart.

Thus, a cargo cart that is adaptable between a wheeled embodiment and a sled embodiment and method of use thereof would be well received in the art.

BRIEF DESCRIPTION OF THE INVENTION

According to one aspect of the invention, a cargo cart comprises: a bed configured for carrying cargo, the bed having a front side, a back side, a left side and a right side, the bed having an upper surface and an under surface; an axle located beneath the under surface of the bed and extending from a left end proximate the left side of the bed to a right end proximate the right side of the bed, the axle having a first bend proximate the left end, the axle extending from the first bend away from the bed, the axle having a second bend proximate the right end, the axle extending from the second bend away from the bed, the axle having a first attachment location at the left end and a second attachment location at the right end, wherein the first and second attachment locations are each configured to removably attach both a wheel and a ski such that only one of the wheel and the ski are attachable to the first and second attachment locations at a time; and a first shaft connected to the axle proximate at least one of the left end and the right end of the axle and extending to the back side of the bed; and wherein the axle is configured to rotate between a first position and a second position, wherein the first shaft is removably connected to the under surface of the bed at a first location when the axle is in the first position, and wherein the first shaft is removably connected to the undersurface bed at a second location when the axle is in the second position, wherein the first location is closer to the back side of the bed than the second location.

According to another aspect of the invention, a kit comprises: a bracket configured to attach to an under surface of a bed of a cargo cart; an axle configured to attach to the bracket, the axle extending from a left end to a right end, the axle having a first bend proximate the left end, the axle extending from the first bend away from the bed when the axle is attached to the under surface of the cargo cart, the axle having a second bend proximate the right end, the axle extending from the second bend away from the bed when the axle is attached to the under surface of the cargo cart, the axle having a first attachment location at the left end and a second attachment location at the right end, wherein the first and second attachment locations are each configured to removably attach both a wheel and a ski such that only one of the wheel and the ski are attachable to the first and second attachment locations at a time; a tongue configured to attach to the under surface of the bed; a first shaft having an axle attachment end with an opening and an under surface attachment end, the opening of the axle attachment end being insertable over at least one of the left end and the right end of the axle, the under surface attachment end being configured to removably attach to the under surface of the bed; and a stabilizer element configured to attach to the axle and prevent rotation of the removably attached ski.

According to yet another aspect of the invention, a method of using a cargo cart comprises: removing a wheel from an end of an axle of the cargo cart, wherein the axle is in a first position; rotating the axle of the cargo cart into a second position, wherein the end of the axle is located further from an under surface of a bed of the cargo cart in the second position than in the first position; inserting a ski onto the end of the axle when the axle is in the second position; and securing the ski to the axle of the cargo cart.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

A detailed description of the hereinafter described embodiments of the disclosed apparatus and method are presented herein by way of exemplification and not limitation with reference to the Figures.

Figure 1:
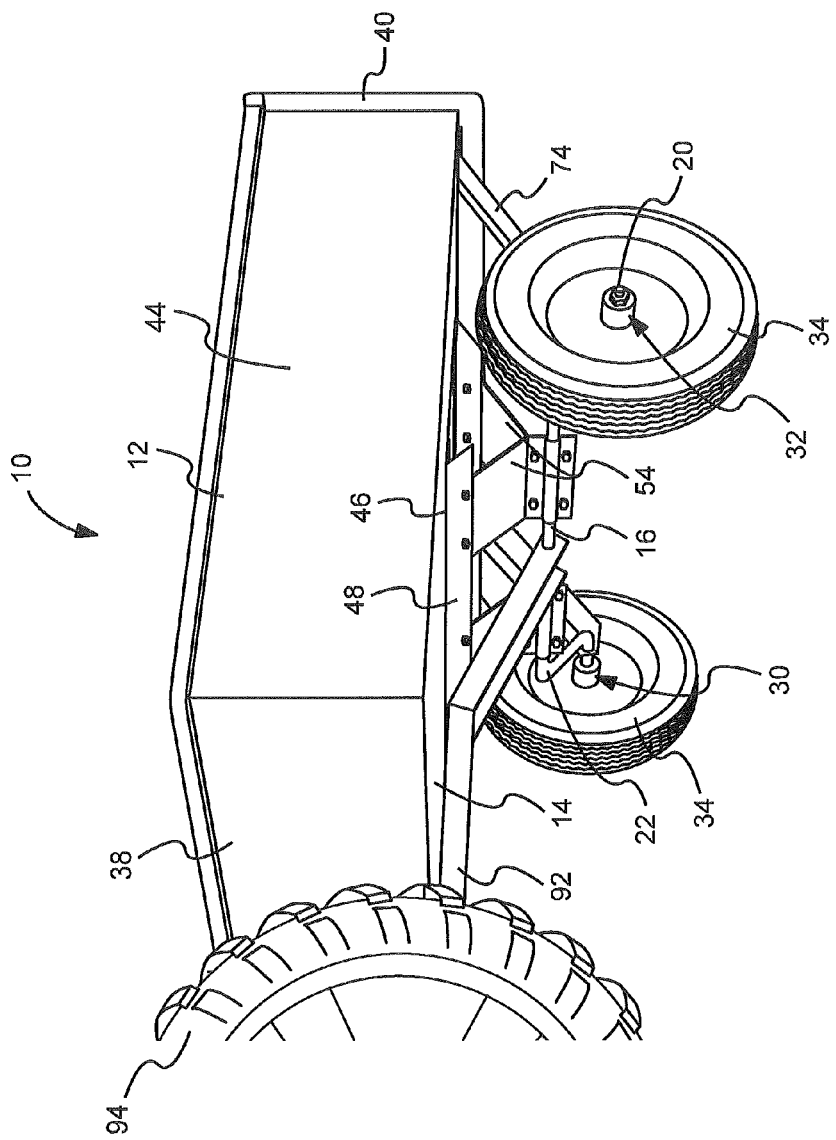
FIG. 1 depicts a perspective view of a cargo cart having an axle with attached wheels in accordance with one embodiment.
Figure 2:
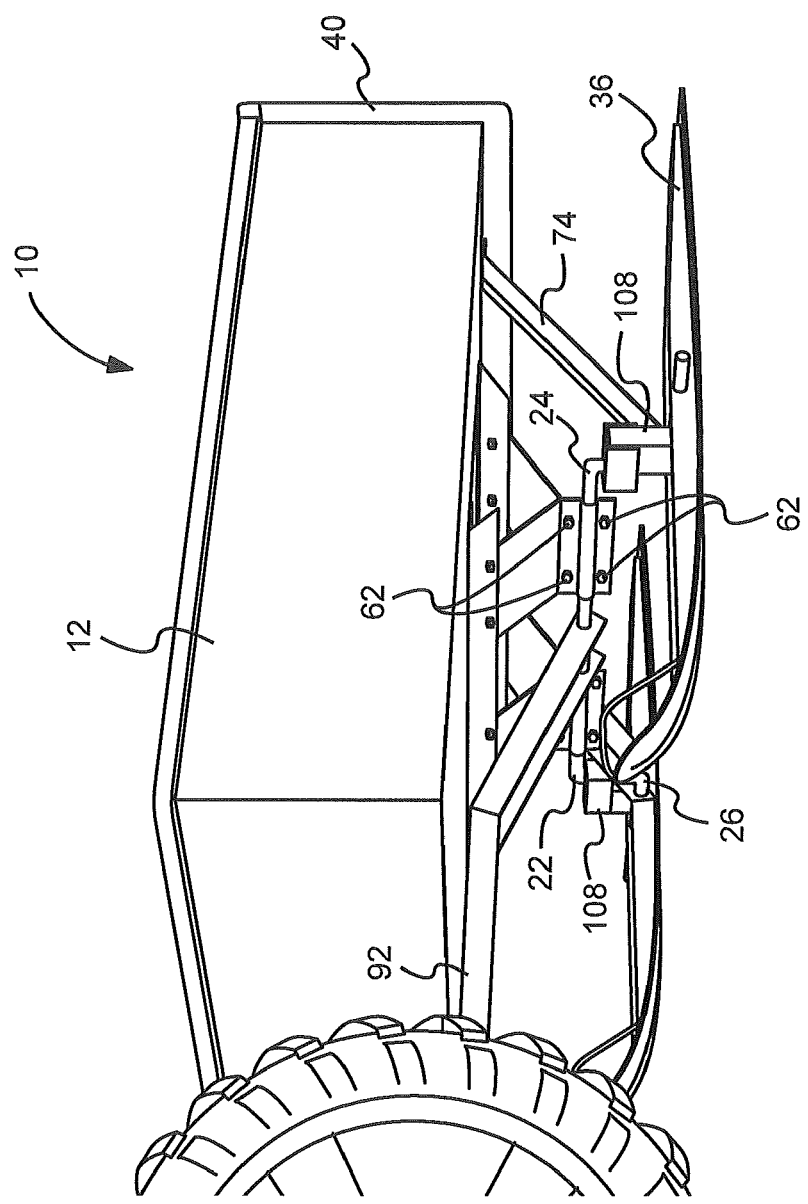
FIG. 2 depicts a perspective view of the cargo cart of FIG. 1 having the axle with attached skis in accordance with one embodiment.

Referring first to FIGS. 1-2, a cargo cart 10 having a bed 12 configured for carrying cargo is shown. The cargo cart 10 is adaptable between a wheeled embodiment, shown in FIG. 1, and a sled embodiment, shown in FIG. 2. Attached to an under surface 14 of the bed 12 is an axle 16. The axle 16 extends between a left end 18 and a right end 20. In the embodiment shown, the axle 16 includes four 90° bends 22, 24, 26, 28. A first bend 22 is proximate the left end 18 while a second bend 24 is proximate the right end 20. The axle 16 extends from each of the first bend 22 and the second bend 24 away from the under surface 14 of the bed 12. The axle 16 also includes a third bend 26 that is located between the first bend 22 and the left end 18, and a fourth bend 28 that is located between the second bend 24 and the right end 20. To accommodate both the sled and the wheeled embodiments, the axle 16 includes a first attachment location 30 located at the left end 18 and a second attachment location 32 located at the right end 20 that are each configured to removably attach both a wheel 34 and a ski 36, one at a time. The axle 16 is configured to rotate between two positions in order to retain the bed 12 at similar levels between the two embodiments. In the sled embodiment, the axle 16 extends perpendicularly from the first and second bends 22, 24 away from the under surface 14 (shown more particularly in FIG. 5). Alternately, in the wheeled embodiment the axle 16 extends at a 45° angle from the first and second bends 22, 24 away from the under surface 14 (shown more particularly in FIG. 3). Thus, the axle 16 is configured to prop the bed 12 up in the ski embodiment in order to compensate for the reduced height resulting from the removal of the wheels 34 and the attachment of the skis 36.

The bed 12 of the cargo cart 10 includes a front side 38, a back side 40, a left side 42 and a right side 44. Furthermore, the bed 12 has an upper surface 46 for carrying cargo opposed to the under surface 14. It should be understood that the bed 12 may be any appropriate cargo carrying structure. While the bed 12 includes a flat carrying surface, this embodiment is not limiting. In other embodiments contemplated, the bed 12 may have various sizes and dimensions. The bed 12 may be made of metal such as sheet metal, cast iron, aluminum, steel, stainless steel. Additionally, plastics, composites or any other appropriate material is also contemplated. The bed 12 may be configured to carry chopped wood, bricks, stone, dirt, plants, sand, mulch, or any other appropriate material. Depending on the intended cargo to be carried, the bed 12 may have various load capacities.

Attached to the under surface 14 of the bed 12 is a bracket 46. The bracket 46 is configured to secure the axle 16 to the under surface 14 of the bed 12 such that the axle 16 is rotatable. The bracket 46 may comprise a base portion 48 that is attached to the under surface 14 of the bed 12, extending across the bed 12 from the left side 42 to the right side 44. The base portion 48 may be attached to the under surface 14 of the bed 12 by a bolt, welding, or any other attachment means. In one embodiment, the base portion 48 may be integrally included in the manufacturing of the under surface 14 of the bed 12. The base portion 48 of the bracket 46 is bent along the edges that run from the left side 42 to the right side 44. The base portion 48 includes a first acutely angled bend 50 and a second acutely angled bend 52.

The bracket 46 may further include two pairs of axle securing plates 54, 56, each axle securing plate being attached to the acutely angled bends 50, 52 and extending from the acutely angled bends 50, 52 at the same, or substantially similar, acute angles from the under surface 14. The axle securing plates 54, 56 may be attached to the first and second acutely angled bends 52 of the base portion 48 by bolts 58. However, welding or any other appropriate attachment means are contemplated. The individual plates of each of the pairs 54, 56 meet at a point that is above where the axle 16 is attached. Each of the plates from the two pairs 54, 56 include an obtrusely angled bend 57 such that each of the plates 54, 56 extend perpendicularly from their respective bends 57 under the surface 14 of the bed 12. The perpendicularly extending portion of the plates 54, 56 each include a half-circle shaped channel 60 wrapping around the axle 16. Thus, the combination of each pair 54, 56 and their respective channels 60 surrounding the axle 16. Four bolts 62 are shown connecting the two plates from each pair of plates 54, 56. It should be understood that the bolts 62 may also be any other attachment means. Two bolts 62 are shown above the channel 60 and the axle 16 and two bolts 62 are shown below the channel and the axle 16 to connect each of the pairs of plates 54, 56 and secure the axle 16 in the proper position. The bolts 62 may be tightened to secure the axle 16 between each the pairs of axle securing plates 54, 56.

In the embodiment depicted, the axle 16 may be attached and secured to the bracket 46 during the installation of the pairs of plates 54, 56 with the bolts 62. However, the securing mechanism is not limited to a bracket, such as the bracket 46 depicted in the embodiment shown. Rather, any other securing mechanism is contemplated such that the axle 16 is securably rotatable between the first wheeled position and the second sled position, as described herein. For example, the particular angles 52, 57 may be different than the embodiment shown and described. The axle 16 may not be secured by the bracket 46 substantially below the under surface 14 of the bed 12. Instead, the axle 16 may be directly attached to the under surface 14 with a simple bracket such that the axle 16 directly abuts the under surface 14.

The axle 16 shown in the Figures includes the four 90° bends 22, 24, 26, 28. Correspondingly, the axle 16 includes five sections 64, 66, 68, 70, 72. A first section 64 of the axle 16 is located between the first bend 22 and the second bend 24. A second section 66 of the axle 16 is located between the third bend 26 and the left end 18. A third section 68 of the axle is located between the fourth bend 28 and the right end 20. A fourth section 70 of the axle 16 is located between the first bend 22 and the third bend 26. Finally, a fifth section 72 of the axle 16 is located between the second bend 24 and the fourth bend 28. The first section 64 may be parallel with the second and third sections 66, 68, as shown in the Figures. These sections 64, 66, 68 may also be parallel with the under surface 14 of the bed 12.

Although the bends 22, 24, 26, 28 are shown as 90° bends, other embodiments are contemplated. For example, the bends 22, 24, 26, 28 may be more or less than 90°. In one embodiment, the first and second bends 22, 24 may be obtuse bends (not shown) having an angle greater than 90°. To compensate, the third and fourth bends 26, 28 may also have a greater angle than 90°. Thus, the first section 64 may still be parallel with the second and third sections 66, 68 in this embodiment. Furthermore, the bends 22, 24, 26, 28 may have more or less curvature. For example, the bends 22, 24, 26, 28 may have less curvature and the sections 64, 66, 68, 70 72 may be less pronounced. Alternately, the axle 16 may not have "bends," but rather have firm corners. Any embodiment where the axle 16 is rotatable such that the axle 16 is configured to prop the bed 12 up in the ski embodiment in order to compensate for the reduced height resulting from the removal of the wheels 34 and the attachment of the skis 36 is contemplated.

The cargo cart 10 further includes a first shaft 74 and a second shaft 76 to support the axle 16, and retain the axle 16 in the wheeled position and the sled position. The first and second shafts 74, 76 may be angle irons, having a perpendicularly angled bend along the length as shown in the Figures. The first and second shafts 74, 76 may include an axle attachment end 78 having an opening, hole or bore 80 such that it may be slid onto the first and second ends 18, 20 of the axle 16, respectively. The first and second shafts 74, 76 may extend from the axle 16 to the under surface attachment end 82 at the back side 40 of the under surface 14 of the bed 12. Attachment mechanism 86 such as bolts, screws or the like may be used to attach the shafts 74, 76 to a corresponding attachment location 88, 90 of the under surface 14 of the bed 12. The attachment opening, hole or bore of the first and second shafts 74, 76 may be an opening through which the attachment mechanism 86 attaches the first shaft 74 or the second shaft 76 to the corresponding attachment location 88, 90 of the under surface 14 of the bed 12.

Figure 3:
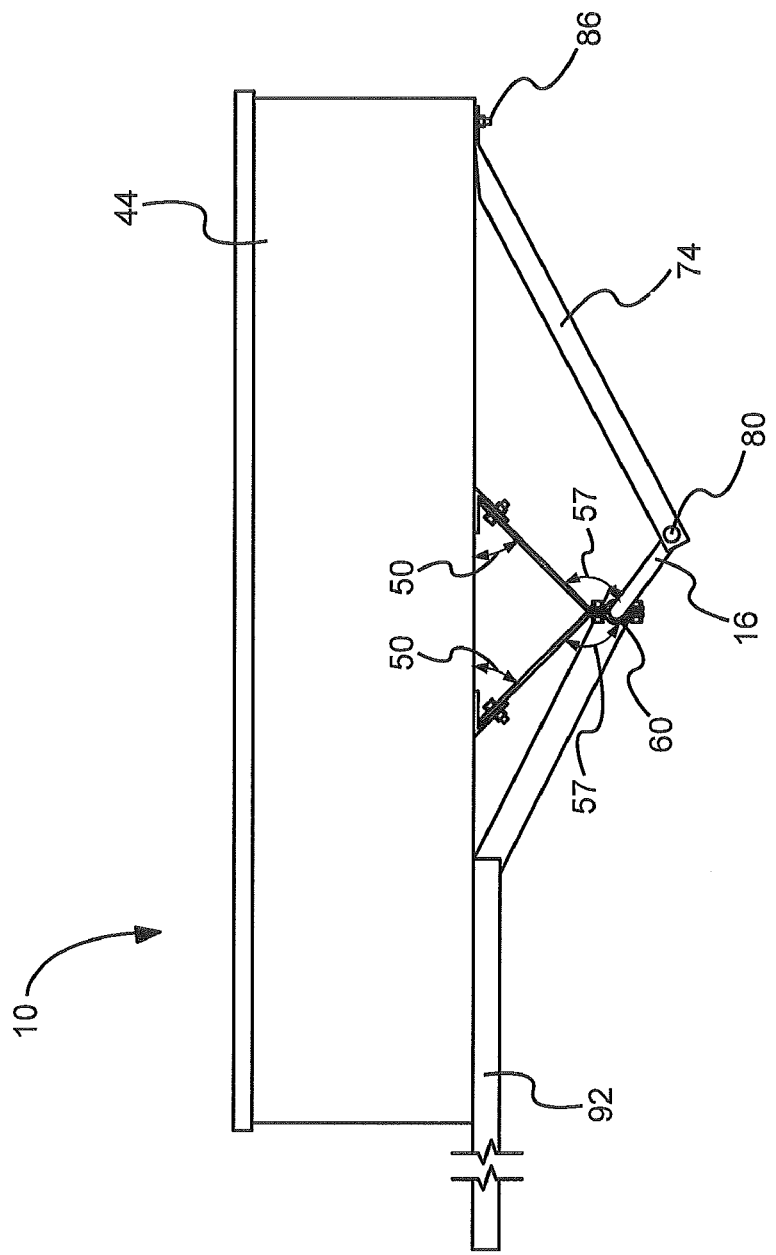
FIG. 3 depicts a side view of the cargo cart of FIGS. 1 and 2 where the axle is in the wheel attachment position, without the wheels being attached in accordance with one embodiment.
Figure 4:
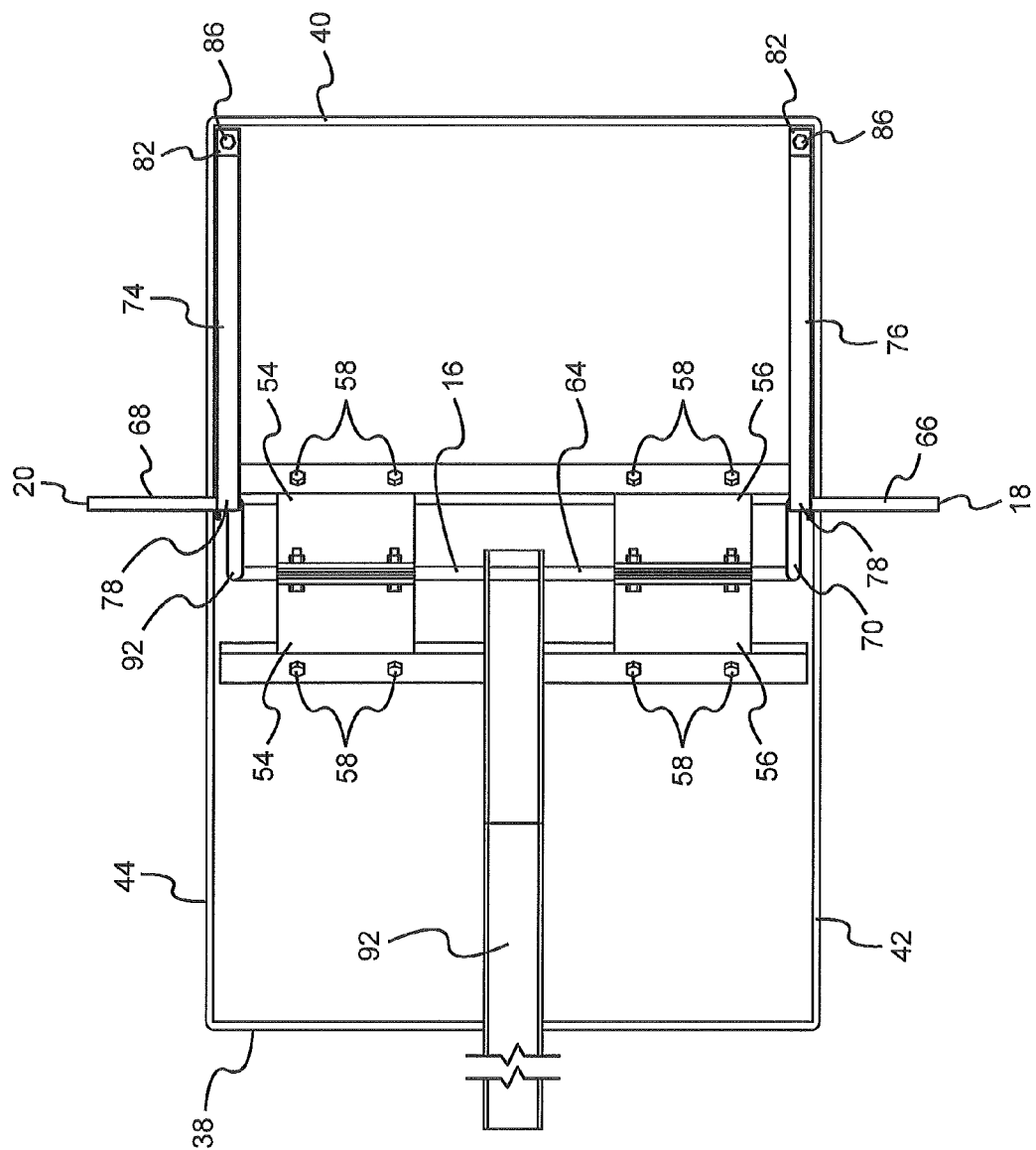
FIG. 4 depicts a bottom view of the cargo cart of FIGS. 1-3 where the axle is in the wheel attachment position, without the wheels being attached in accordance with one embodiment.

FIGS. 3 and 4 depict a side view and a bottom view, respectively, of the cargo cart 10 of FIGS. 1 and 2 where the axle 16 is in the wheel attachment position. In the wheel attachment position, the fourth and fifth sections 70, 72 extend at a 45° angle with respect to the under surface 14 of the bed 12. The fourth and fifth sections 70, 72 extend toward the back side 40 of the under surface 14. The first and second shafts 74, 76 each extend from the axle 16 to a first attachment location 88 of the under surface 14 of the bed 12. The first attachment location 88 is located in close proximity to the back side 40 of the bed 12. The first and second shafts 74, 76 may each be removably secured to their respective first attachment locations 88 by the attachment mechanism 86, such as a bolt, screw, or other appropriate securing mechanism or fastener.

Figure 5:
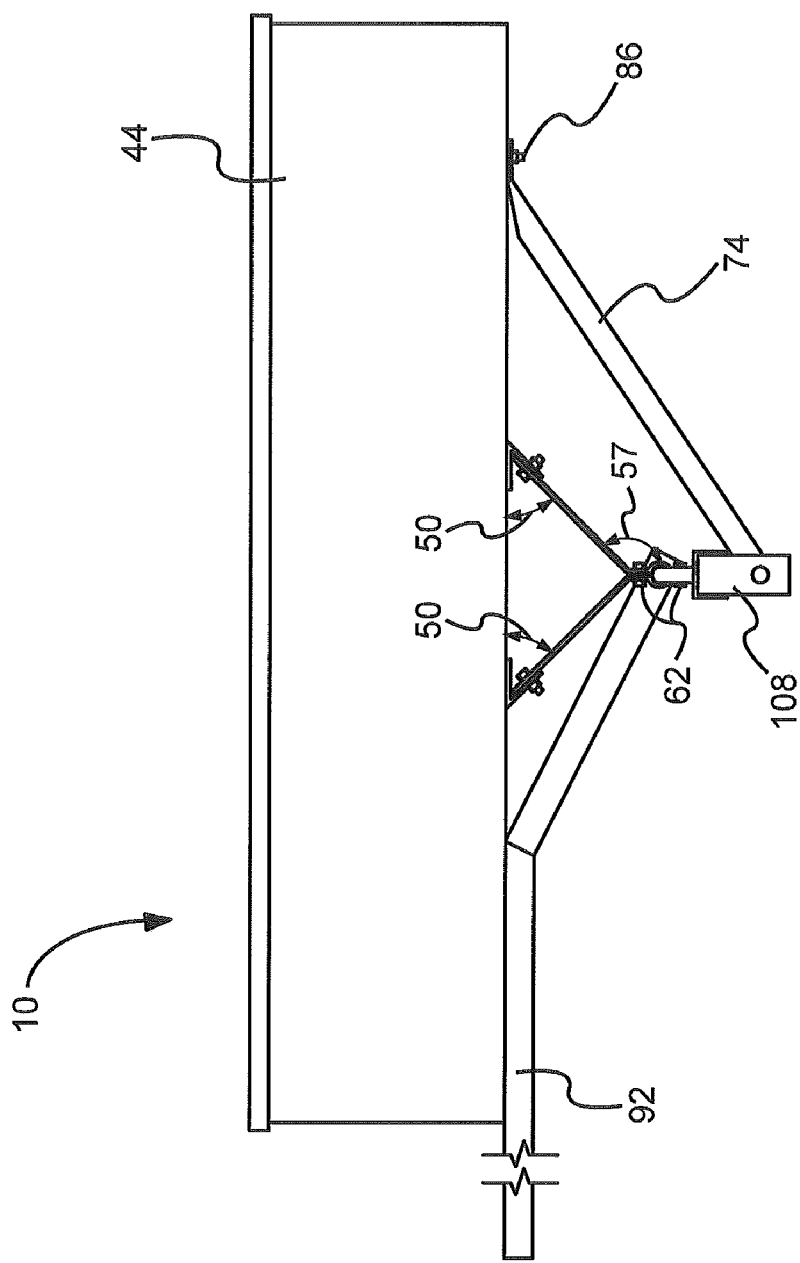
FIG. 5 depicts a side view of the cargo cart of FIGS. 1-4 where the axle is in the ski attachment position, without the skis being attached in accordance with one embodiment.
Figure 6:
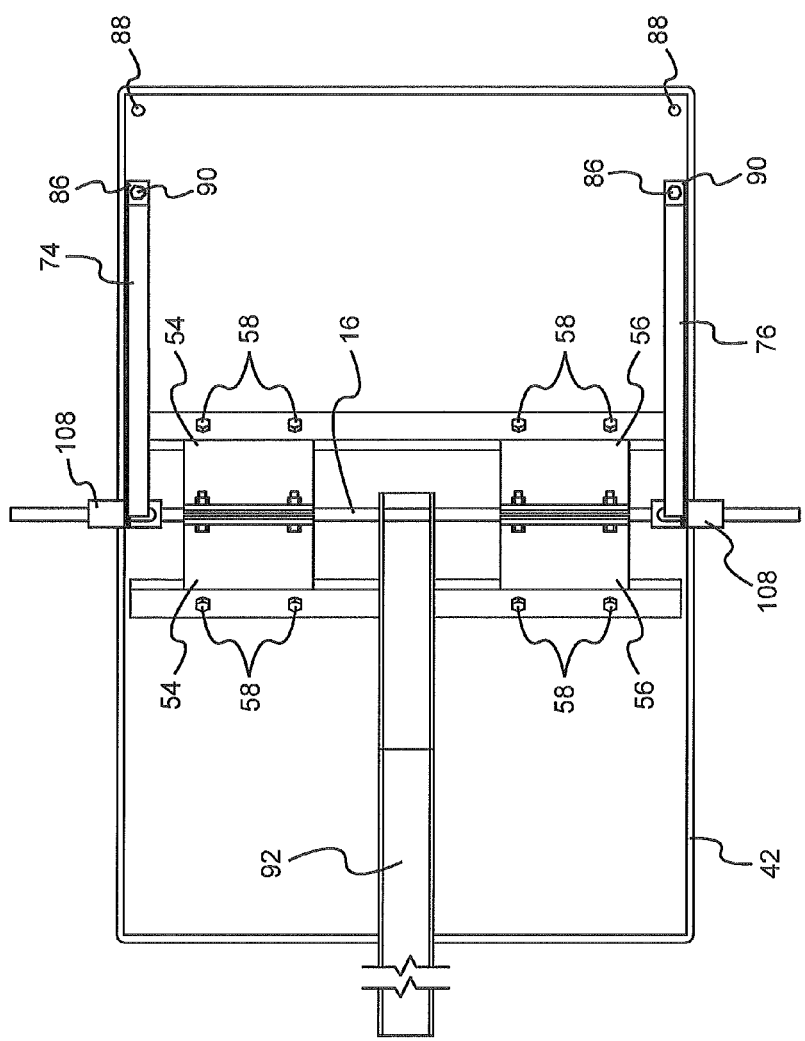
FIG. 6 depicts a side view of the cargo cart of FIGS. 1-5 where the axle is in the ski attachment position, without the skis being attached in accordance with one embodiment.

FIGS. 5 and 6 depict a side view and a bottom view, respectively, of the cargo cart 10 of FIGS. 1 and 2 where the axle 16 is in the ski attachment position. In the ski attachment position, the fourth and fifth sections 70, 72 extend at a 90° angle with respect to the under surface 14 of the bed 12. The first and second shafts 74, 76 each extend from the axle 16 to a second attachment location 90 of the under surface 14 of the bed 12. The second attachment location 90 is located farther from the back side 40 of the bed 12 than the first attachment location 88. The first and second shafts 74, 76 may each be removably secured to their respective second attachment locations 90 by the attachment mechanism 86.

Thus, a person may easily convert the cargo cart 10 from the wheel attachment position, shown in FIGS. 3 and 4, to the ski attachment position, shown in FIGS. 5 and 6. To do so a person would simply unattach, loosen, or remove the attachment mechanism 86 from the first attachment location 88, thereby separating the shafts 74, 76 from the under surface 14 of the bed 12. The person may then rotate the axle 16 freely into the appropriate position so that the attachment openings (not shown) of the shafts 74, 76 line up with the second attachment location 90. The person may then reattach the attachment mechanisms 86 to secure the shafts 74, 76 and retain the axle 16 in the appropriate position.

It should be understood that the amount of rotation, and degree with which the fourth and fifth sections 70, 72 extend with respect to the under surface 14 of the bed 12 is not limited to the 90° and 45° angles described hereinabove. For example, in the wheeled embodiment, the fourth and fifth sections 70, 72 of the axle 16 may extend substantially parallel with the under surface 14 of the bed 12. Any appropriate angle difference is contemplated, so long as the axle 16 is configured to prop the bed 12 up in the ski embodiment compared with the wheel embodiment. Furthermore, it may be particularly advantageous to have an angle greater than 180° between the shafts 74, 76 and the fourth and fifth sections 70, 72, to reduce unwanted rotation of the axle 16 once the shafts 74, 76 are secured.

Referring back to FIGS. 1-2, the cargo cart 10 may include a tongue 92 configured to attach the cargo cart 10 to a vehicle 94. The tongue 92 may be attached directly to the axle 16 and extend from the axle 16 to the front side 38 of the bed 12. The tongue 92 may extend beyond the front side 38 of the bed 12 to attach to the vehicle 94 so that the bed may be towed. The tongue 92 may include one or more attachment mechanisms 96, such as bolts, screws, fasteners or the like to securely attach the tongue 92 to the under surface 14 of the bed 12. The tongue 92 may include a bend 98 such that the tongue 92 extends along the under surface 14 of the bed 12. It should be understood that the tongue 92 may be attachable to trailer hitches from any vehicles such as an ATV or four-wheeler, a snowmobile, a truck, or the like.

Figure 7:
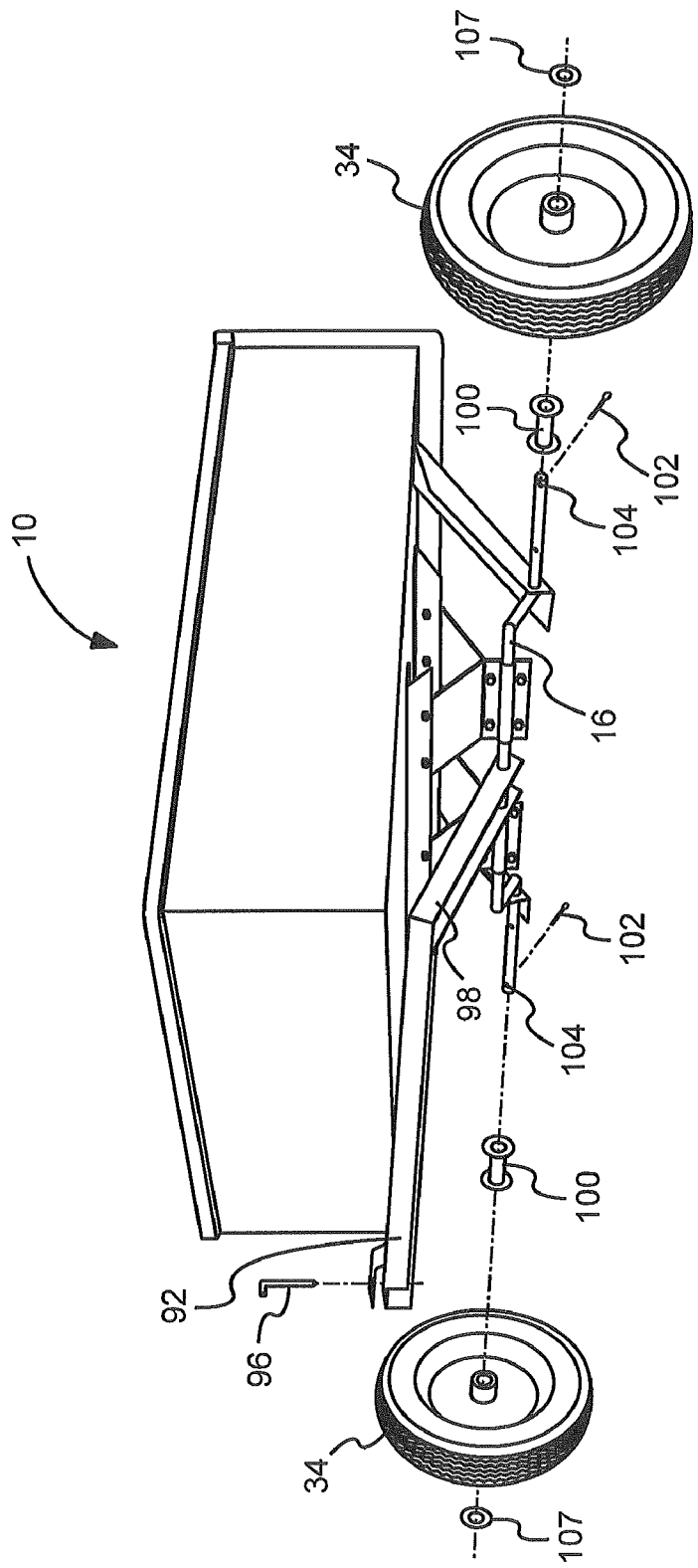
FIG. 7 depicts an exploded view of the cargo cart of FIGS. 1-6 in the wheeled embodiment.

Referring now to FIG. 7, an exploded view of the cargo cart 10 is shown in the wheeled embodiment. Particularly, FIG. 7 shows how the wheels 34 attach to the axle 16. To attach and secure the wheels 34, the openings 80 of the shafts 74, 76 are first inserted into the ends 18, 20 of the axle 16. Next, a bushing 100 is inserted over each of the ends 18, 20 of the axle 16. The bushings 100 may be configured to space the wheels 34 away from the third and fourth bends 26, 28. Furthermore, the bushings 100 may be required because the width of the wheels 34 may be shorter than the width of the skis 36. The bushings 100 may be hollow cylinders configured to space the wheels 34 in a correct position and prevent the wheels 34 from loosely wavering along the axle 16 during use. Once the bushings 100 have been inserted over each of the ends 18, 20 of the axle 16, the wheels 34 may be inserted. Finally, a pin 102 may be inserted into a hole 104 in the axle 16 to secure the wheels 34. The hub of the wheel 34 may thus be secured between the bushings 100 and the pin 102.

Figure 8:
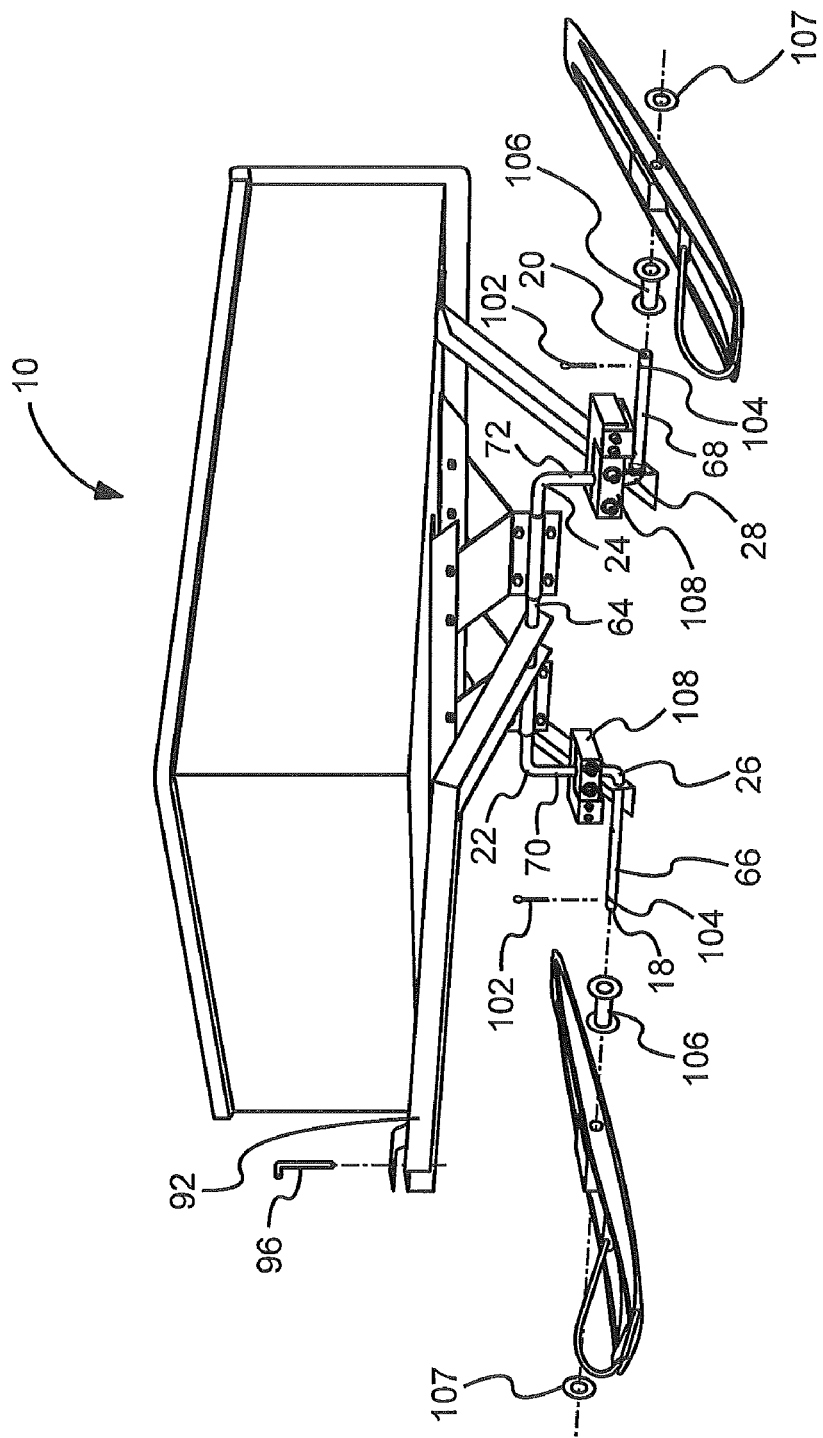
FIG. 8 depicts an exploded view of the cargo cart of FIGS. 1-7 in the ski embodiment.

FIG. 8 shows an exploded view of the cargo cart 10 in the sled embodiment. Particularly, FIG. 8 shows how the skis 36 attach to the axle 16. To attach and secure the skis 36, the openings 80 of the shafts 74, 76 are first inserted into the ends 18, 20 of the axle 16 similar to the attachment of the wheels 34, described hereinabove. Next a bushing 106 is inserted over each of the ends 18, 20 of the axle 16. The bushings 106 may be configured to space the skis 36 away from the third and fourth bends 26, 28. The bushings 106 may have a lesser length than the wheel bushing spacers 100. Once the bushings 106 have been inserted over each of the ends 18, 20 of the axle 16, the skis 36 may be inserted. A second bushing or washer 107 may next be inserted over each of the ends 18, 20. Finally, the pin 102 may be inserted through the hole 104 in the axle 16 to secure the skis 36.

Figure 9:
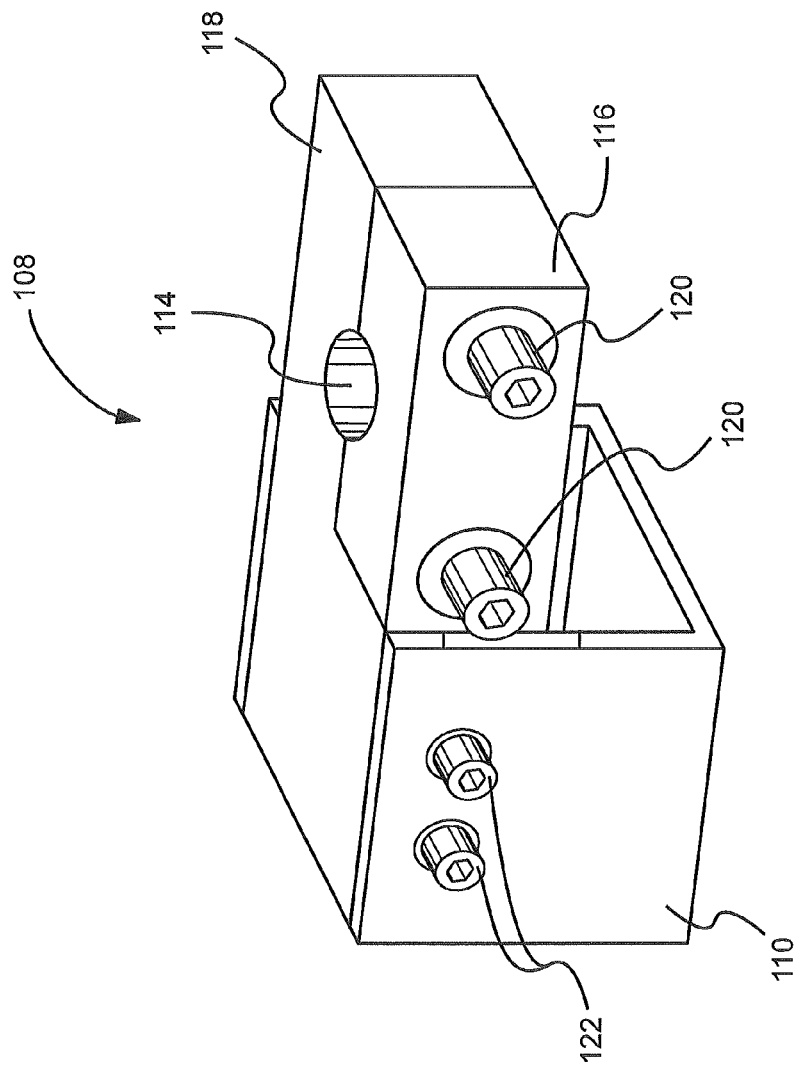
FIG. 9 depicts a perspective view of a stabilizer block in accordance with one embodiment.

Once the skis 36 have been inserted and secured on the axle 16, the skis 36 may be undesirably free to rotate about the axle 16. To prevent this, a stabilizing element or elements may be utilized. Shown in the Figures and more particularly in FIG. 9 is a stabilizer block 108 and stabilizer extension piece 110 that are utilized in combination with a foam block 112 (shown in FIG. 11) to prevent rotation of the skis 36. The stabilizer block 108 may be attachable to the fourth and fifth sections 70, 72 of the axle 16. The stabilizer extension piece 110 may be a U-shaped piece. The two sides of the U-shape of the stabilizer piece 110 each extend from the stabilizer block 108 to the axle 16 such that the bottom of the U-shape is adjacent to the axle 16. Each of the sides of the U-shape of the stabilizer piece 110 extends to opposite sides of the axle 16. The foam block 112 may have a bore 114 there through and may be located between opposing walls 116 of the skis 36. The block 112 may be inserted over the axle 16 during the installation and securing of the skis 36 to the axle 16. The bottom of the U-shaped extension piece 110 may abut the foam block 112 to prevent significant rotation of the skis 36. Of course, the stabilizer block 108, stabilizer extension piece 110 and the foam block 112 may not prevent all rotation of the skis 36, but may allow minor rotation of the skis 36.

The stabilizer block 108 may include a corner piece 116 that is detachable and attachable to a main portion 118 of the stabilizer block 108. This allows for the stabilizer block 108 to be removed during the wheeled embodiment and attached during the sled embodiment of the cargo cart 10. Detachment of the corner piece 116 allows for the attachment of the stabilizer block 108 to the axle 16. Bolts 120 may be utilized to attach and detach the corner piece 116 with the main portion 118. Likewise, bolts 122 may be utilized to secure the stabilizer extension piece 110 to the stabilizer block 108. The bolts 122 may be the same or different from the bolts 120. Furthermore, other attachment elements may be utilized instead of the bolts 120 and the bolts 122. For example, screws, fasteners, welds, nuts, or the like may be used. Any attachment mechanisms are contemplated.

Moreover, the stabilizer block 108, stabilizer extension piece 110, and foam block 112 are shown to stabilize the ski 36. However, other stabilization means are contemplated. For example, a single stabilizer element may be attachable to the axle 16, rather than the stabilizer block 108 and the stabilizer extension piece 110 combination. Alternately, a stabilizer may be integrally included in the axle 16. Any stabilizing means is contemplated that prevents undesirable substantial rotation of the skis 36 about the axle 16.

Figure 10:
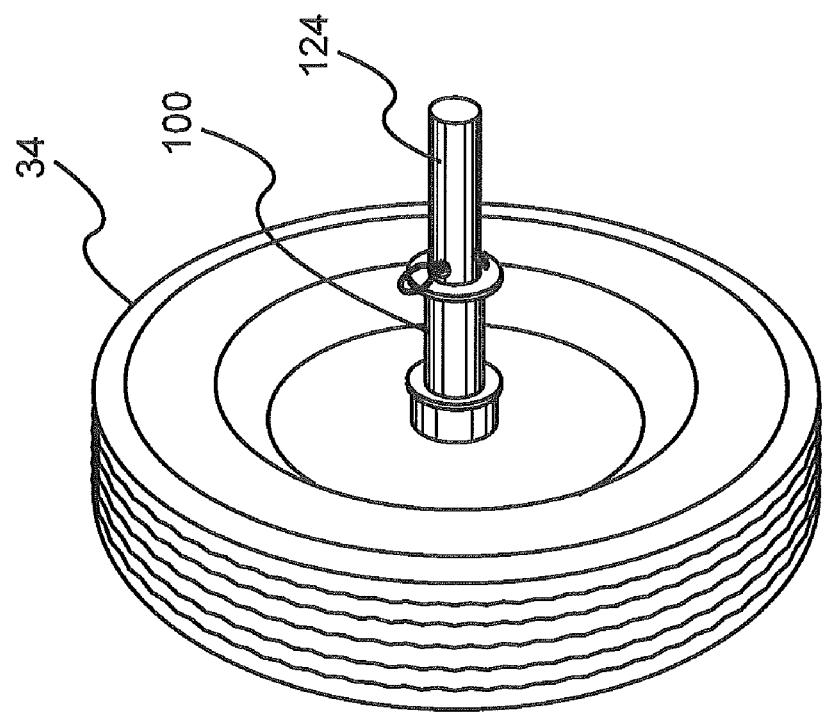
FIG. 10 depicts an unattached wheel in a storage configuration in accordance with one embodiment.
Figure 10:
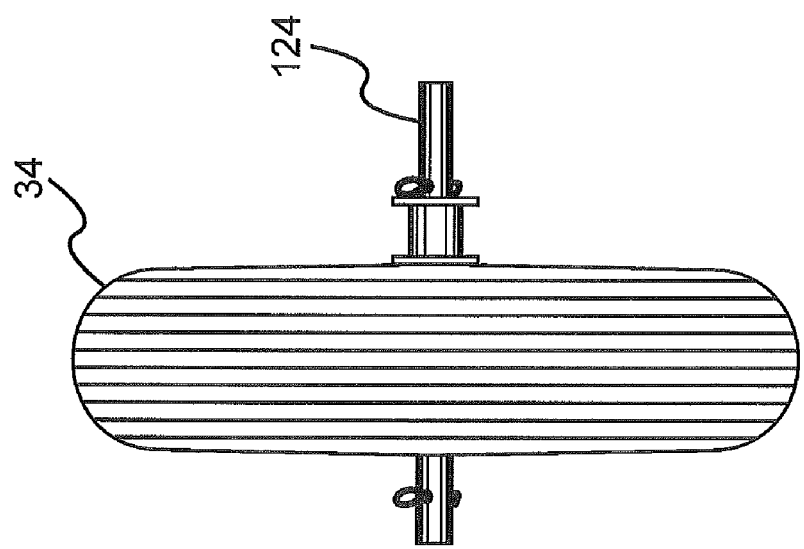

FIG. 10 shows the wheel 34 in an unattached storage configuration. The wheels 34 may be stored in this condition when the cargo cart 10 is in the sled embodiment and does not require the wheels 34 or the bushing 100. In this embodiment, two hollow rods 124 may be provided that are each inserted into the respective hubs of the unused wheels 34. The hollow rod 124 may include holes at each end for the insertion of pins to retain the wheel 34 and bushing 100 together. The hollow rod 124 may thus be used to prevent a person from losing the bushing 100 or pins when the wheel 34 is not in use.

Figure 11:
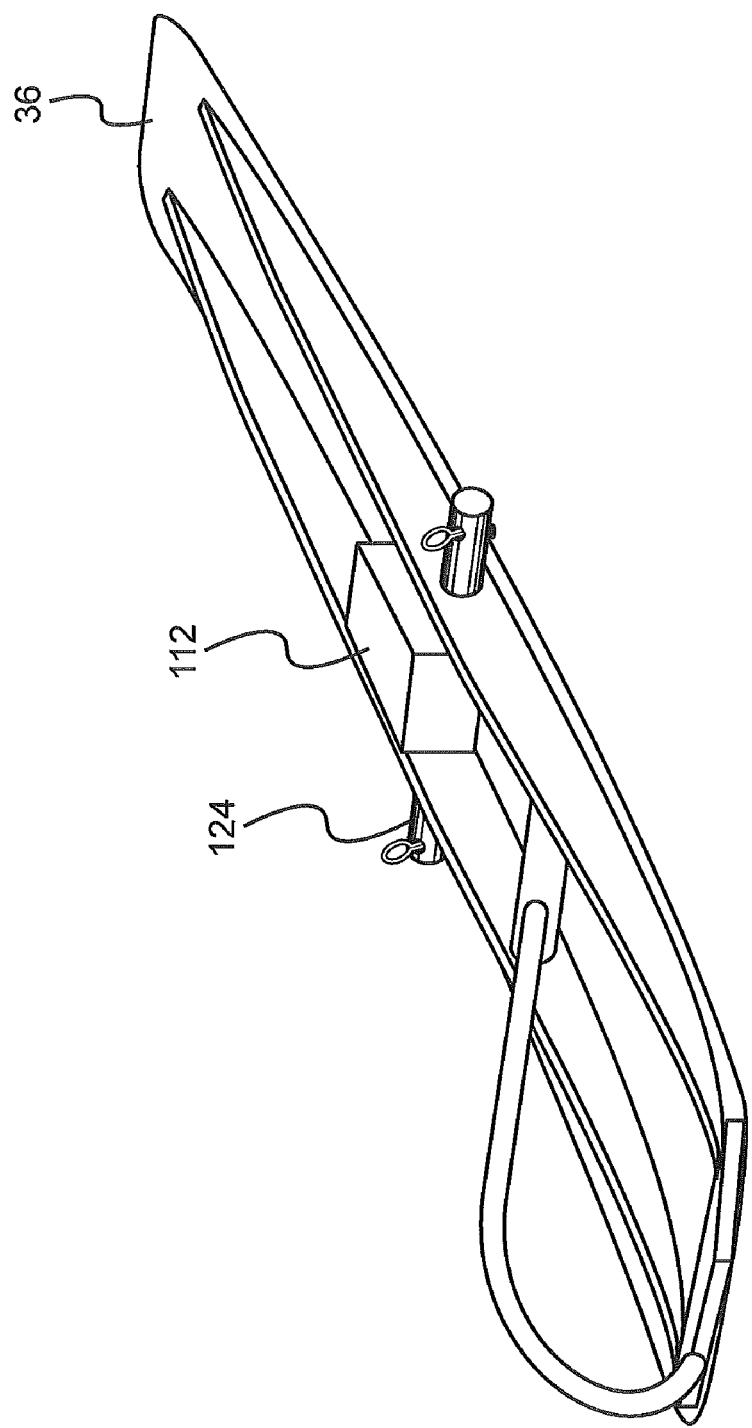
FIG. 11 depicts an unattached ski in a storage configuration in accordance with one embodiment.

Referring to FIG. 11, the ski 36 is shown in an unattached storage configuration. The skis 36 may be stored in this condition when the cargo cart 10 is in the wheeled embodiment and does not require the skis 36 or the bushings 106. In this embodiment, the same two hollow rods 124, described hereinabove, may be provided that are each inserted into the respective openings of the unused skis 36. The hollow rod 124 may thus also be used to prevent a person from losing the bushings 106 or pins when the ski 36 is not in use.

In a further embodiment, a kit may be provided that includes any or all of the elements described herein. The elements may be configured to convert a typical cargo cart into a cargo cart that is convertible between a wheeled embodiment and a sled embodiment, such as the cargo cart 10. To accomplish this, the kit may include two wheels and two skis, such as the wheels 34 and the skis 36. Alternately, the kit may include only the skis, if the typical cargo cart includes acceptable wheels. The kit may include a bracket, such as the bracket 46, configured to attach to the under surface of the cargo cart. The kit may include a bent axle, such as the axle 16. The kit may also include a tongue, such as the tongue 92. The kit may also include shafts, such as the shafts 74, 76. Furthermore, the kit may include a stabilizer element or elements, such as the stabilizer block 108, stabilizer extension piece 110, and foam block 112. Still further, the kit may include pins, such as the pins 102 and bushings, such as the bushings 100, 106. The kit may yet further include two hollow rods, such as the rods 124 for storing the wheels when the cart is in the sled embodiment and for storing the skis when the cargo cart is in the wheeled embodiment. Finally, the kit may include a number of bolts or any other appropriate attachment mechanisms, such as the bolts 58, 62, 86, 96, 120, 122.

Moreover, a method of using a cargo cart, such as the cart 10 is disclosed herein. The method of using the cargo cart may comprise removing a wheel, such as the wheel 34, from an end of an axle, such as the axle 16 of the cargo cart, wherein the axle is in a first position. The method may further comprise rotating the axle of the cargo cart into a second position. The end of the axle is located further from an under surface, such as the under surface 14, of a bed, such as the bed 12, of the cargo cart in the second position than in the first position. The method may further include inserting a ski, such as the ski 36, onto the end of the axle of the cargo cart when the axle is in the second position. Still further, the method may include securing the ski to the axle of the cargo cart after the ski is inserted. Securing the ski to the axle may further include inserting a pin into a hole of the axle.

Moreover, the method may include removing a shaft, such as one of the shafts 74, 76 from a first location of the under surface of the bed, wherein the shaft is connected to the axle. The method may further comprise securing the shaft to a second location of the under surface of the bed when the axle is in the second position, wherein the second location is located further from a back side of the bed than the first location. The method may further comprise attaching a tongue of the garden cart, such as the tongue 92, to a vehicle.

Elements of the embodiments have been introduced with either the articles "a" or "an." The articles are intended to mean that there are one or more of the elements. The terms "including" and "having" and their derivatives are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention.

Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A cargo cart comprising:
   a bed configured for carrying cargo, the bed having a front side, a back side, a left side and a right side, the bed having an upper surface and an under surface;
   an axle located beneath the under surface of the bed and extending from a left end proximate the left side of the bed to a right end proximate the right side of the bed, the axle having a first bend proximate the left end, the axle extending from the first bend away from the bed, the axle having a second bend proximate the right end, the axle extending from the second bend away from the bed, the axle having a first attachment location at the left end and a second attachment location at the right end, wherein the first and second attachment locations are each configured to removably attach both a wheel and a ski such that only one of the wheel and the ski are attachable to the first and second attachment locations at a time; and a first shaft connected to the axle and extending to the bed; wherein the axle is configured to rotate between a first position and a second position, wherein the first shaft is removably connected to the under surface of the bed at a first location when the axle is in the first position, and wherein the first shaft is removably connected to the undersurface bed at a second location when the axle is in the second position, wherein the first location is closer to the back side of the bed than the second location; and a second shaft connected to the axle proximate the opposite of end of the axle as the first shaft, the second shaft extending to the back side of the bed, wherein the second shaft is removably connected to the under surface of the bed at a third location when the axle is in the first position, and wherein the first shaft is removably connected to the undersurface bed at a fourth location when the axle is in the second position, wherein the first location is closer to the backs side of the bed than the second location.

2. The cargo cart of claim 1, wherein the left end and the right end of the axle are located closer to the under surface of the bed when the axle is in the first position, and wherein the left end and the right end of the axle are located further to the under surface of the bed when the axle is in the second position.

3. The cargo cart of claim 1, wherein the first bend and the second bend are ninety degree bends in the axle.

4. The cargo cart of claim 1, wherein the axle includes a third bend and a fourth bend, wherein the third bend is located between the first bend and the left end, and wherein the fourth bend is located between the second bend and the right end.

5. The cargo cart of claim 4, wherein a first section of the axle is located between the first bend and the second bend, wherein the first section of the axle is parallel with a second section of the axle that is located between the third bend and the left and, and wherein the first section of the axle is parallel to a third section of the axle that is located between the fourth bend and the right end.

6. The cargo cart of claim 5, further comprising a tongue connected to the first portion of the axle and extending from the axle to the front side of the bed, wherein the tongue is configured to attach the cargo cart to a vehicle.

7. The cargo cart of claim 5, wherein the first attachment location is the second portion of the axle and the second attachment location is the third portion of the axle, wherein the second portion and the third portion of the axle are each configured to be inserted into a hub of the wheel and an opening of the ski whereby the wheel and the ski are each securable by a pin through the axle.

8. The cargo cart of claim 7, wherein the first shaft and the second shaft each include an opening such that the second portion of the axle is insertable into the opening of the first shaft, and the third portion of the axle is insertable into the opening of the second shaft.

9. The cargo cart of claim 1, wherein a bracket is attached to the under surface of the bed, and wherein the axle is rotatably secured beneath the under surface of the bed by the bracket.

10. A kit comprising:
a bracket configured to attach to an under surface of a bed of a cargo cart;
an axle configured to attach to the bracket, the axle extending from a left end to a right end, the axle having a first bend proximate the left end, the axle extending from the first bend away from the bed when the axle is attached to the under surface of the cargo cart, the axle having a second bend proximate the right end, the axle extending from the second bend away from the bed when the axle is attached to the under surface of the cargo cart, the axle having a first attachment location at the left end and a second attachment location at the right end, wherein the first and second attachment locations are each configured to removably attach both a wheel and a ski such that only one of the wheel and the ski are attachable to the first and second attachment locations at a time;
a tongue configured to attach to the under surface of the bed;
a first shaft having an axle attachment end with an opening and an under surface attachment end, the opening of the axle attachment end being insertable over at least one of the left end and the right end of the axle, the under surface attachment end being configured to removably attach to the under surface of the bed; and
a stabilizer element configured to attach to the axle and prevent rotation of the removably attached ski.

11. The kit of claim 10, further comprising a second shaft having an axle attachment end with an opening and an under surface attachment end, the opening of the axle attachment end being insertable over at least one of the left end and the right end of the axle, the under surface attachment end being configured to removably attach to the under surface of the bed.

12. The kit of claim 10, wherein the axle includes a hole and wherein the kit further comprises a pin for insertion into the hole of the axle, wherein the pin is configured to secure at least one of the wheel and the ski to the axle.

13. The kit of claim 10, further comprising a bushing insertable over the axle and configured to space the wheels in a correct position and prevent the wheels from loosely wavering along the axle during use.

14. The kit of claim 10, wherein the axle includes a third bend and a fourth bend, wherein the third bend is located between the first bend and the left end, wherein the fourth bend is located between the second bend and the right end, and wherein a first section of the axle is located between the first bend and the second bend, wherein the first section of the axle is parallel with a second section of the axle that is located between the third bend and the left and, and wherein the first section of the axle is parallel to a third section of the axle that is located between the fourth bend and the right end.

15. The kit of claim 14, wherein the axle includes a fourth section located between the first bend and the third bend, wherein the axle includes a fifth section located between the second bend and the fourth bend, and wherein the fourth section is parallel with the fifth section.

16. A method of using a cargo cart, the method comprising:
removing a wheel from an end of an axle of the cargo cart, wherein the axle is in a first position;
rotating the axle of the cargo cart into a second position, wherein the end of the axle is located further from an under surface of a bed of the cargo cart in the second position than in the first position;
inserting a ski onto the end of the axle when the axle is in the second position; and
securing the ski to the axle of the cargo cart;
wherein the securing the ski to the axle includes inserting a pin into a hole of the axle.

17. The method of claim 16, further comprising:
removing a shaft from a first location of the under surface of the bed, wherein the shaft is connected to the axle; and securing the shaft to a second location of the under surface of the bed when the axle is in the second position, wherein the second location is located further from a back side of the bed than the first location.

18. The method of claim 16 further comprising attaching a tongue of the cargo cart to a vehicle.

* * * * *